United States Patent [19]

Yount

[11] 4,300,955
[45] Nov. 17, 1981

[54] PROCESS FOR REMOVING A RESINOUS COATING FROM FIBERGLASS PRODUCTS

[76] Inventor: John W. Yount, P.O. Box 7, Bullock, N.C. 27507

[21] Appl. No.: 148,147

[22] Filed: May 9, 1980

[51] Int. Cl.³ .............................................. B08B 3/08
[52] U.S. Cl. ........................................ 134/3; 134/18; 134/28; 134/38
[58] Field of Search ...................... 134/3, 18, 25.4, 28, 134/30, 38; 252/DIG. 10

[56] References Cited

U.S. PATENT DOCUMENTS 2,242,106  5/1941  Buckman .................... 134/38 X

FOREIGN PATENT DOCUMENTS 6403079  9/1965  Netherlands .............. 252/DIG. 10

Primary Examiner—Marc L. Caroff
Attorney, Agent, or Firm—Mills & Coats

[57] ABSTRACT

A coating of urea-formaldehyde resin is removed from spun fiberglass with an aqueous phosphoric acid solution. The fiberglass product is subsequently rinsed, dried and chopped for reuse.

6 Claims, 1 Drawing Figure

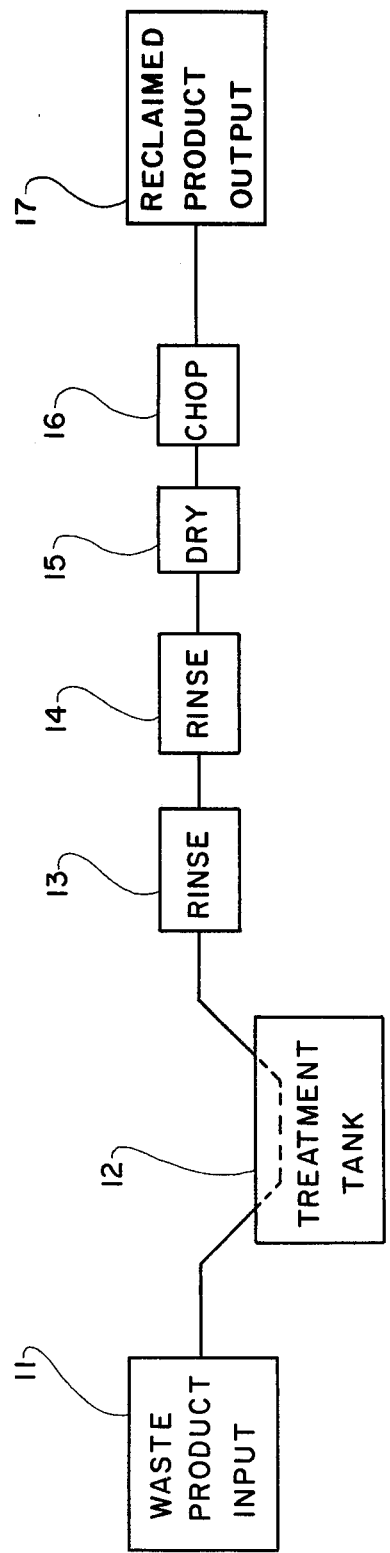

PROCESS FOR REMOVING A RESINOUS COATING FROM FIBERGLASS PRODUCTS

FIELD OF INVENTION

This invention relates to reclaiming processes and more particularly to the process of removing resin from waste spun fiberglass.

BACKGROUND OF INVENTION

Resin treated spun fiberglass has been used for many different processes including the manufacture of products such as air filters of the type used in heating and air conditioning systems. A certain amount of scrap results in the manufacturing process from faulty units, mill ends and the like. Since the spun fiberglass has been treated with resin with no way until now to remove the same, waste products have been disposed of generally in landfill type environments. Since untreated chopped fiberglass sells for around $0.91 a pound on today's market, the waste products that are being disposed of amount to a loss of thousands of dollars a day throughout the industry.

Another problem being encountered is that the resin, which is usually urea-formaldehyde type, breaks down and leaches out into the soil contaminating surrounding surface and underground water sources. Thus the loss is not simply the value of the waste product but also the cost involved in disposing of the same.

BRIEF DESCRIPTION OF INVENTION

After much research and study into the above-mentioned problems, the present invention has been developed to provide a method to remove the resin from resin treated spun fiberglass of either the continuous or chopped fiber type. This process not only returns virtually one hundred percent of the fiberglass treated to a useable condition, but it also eliminates the cost of disposal as well as the resultant pollution control problems associated therewith.

The above is accomplished by passing the product through a treatment tank and then rinsing any residue therefrom prior to drying, chopping, and recycling into the marketplace. This process is relatively inexpensive and yet is highly efficient in the use. It can be adapted to all types of ureaformaldehyde type resin coated fiberglass.

In view of the above, it is an object of the present invention to provide a means for removing resin from resin treated spun fiber-glass.

Another object of the present invention is to provide a simple, relatively inexpensive, and yet highly efficient means for removing resin from treated fiberglass.

Another object of the present invention is to provide means for removing urea-formaldehyde type resin from either continuous or chopped spun fiberglass.

Another object of the present invention is to provide a means for reclaiming waste resin treated fiberglass.

Other objects and advantages of the present invention will become apparent and obvious from a study of the following description and the accompanying drawing which are merely illustrative of such invention.

BRIEF DESCRIPTION OF DRAWING

The drawing is a schematic illustration of the reclaiming process of the present invention.

DETAILED DESCRIPTION OF INVENTION

With further reference to the drawing, the waste product 11 such as urea-formaldehyde resin coated continuous or chopped spun fiberglass is conveyed or otherwise moved into treatment tank 12 containing a mixture of between ten percent and fifty percent phosphoric acid ($H_3PO_4$) to water ($H_2O$) which has been heated to approximately 200 degrees Fahrenheit. The waste product is allowed to remain in the treatment tank between five and thirty seconds or until the resin has been removed from the fiberglass fibers. The product is then removed from the treatment tank and rinsed with water ($H_2O$) at two distinct stages as indicated at 13 and 14. This rinsing can be either by spray, emersion or a combination of the two.

Next the product being reclaimed is dried as indicated at 15 through use of forced air heated to between 80 and 90 degrees Fahrenheit. Next the resin free fibers are chopped as indicated at 16 into commercially useable length of approximately one-quarter inch. The thus reclaimed product is removed from the system at 17.

Since the form of the waste product being put into the system of the present invention varies from loose fiber clumps to baled concentrations to other forms, the means of conveying such products from input to output also varies substantially mechanically. The steps of the process of treatment, however, would remain the same.

Likewise, the method of rinsing and the specific equipment for chopping the fibers can vary mechanically but such devices are well known to those skilled in the art and further detailed discussion of the same is not deemed necessary.

From the above, it can be seen that the process of the present invention takes a presently useless product which manufacturers not only lose but have to pay for disposal of and makes the same into a sellable, commercially useable product selling for as much as $1.00 per pound at 1980 wholesale prices. This process is relatively inexpensive and yet is highly efficient in accomplishing the results desired.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended Claims are intended to be embraced therein.

What is claimed is:

1. A reclaiming process for removing a ureaformaldehyde type resin coating from spun fiberglass products comprising: dipping said coated products into a solution of water and phosphoric acid; removing said product from said solution; rinsing said product to remove any solution and resin residues; and drying said product whereby waste resin treated fiberglass can be reclaimed and reused as a virgin fiberglass product.

2. The process of claim 1 wherein the solution of water and phosphoric acid is in a ratio of between ten percent and fifty percent phosphoric acid to water.

3. The process of claim 1 wherein water is used for rinsing the product.

4. The process of claim 1 wherein said product is rinsed at least twice.

5. The process of claim 1 wherein the product is chopped subsequent to drying.

6. The process of claim 5 wherein said product is chopped into lengths of approximately one-quarter inch.

* * * * *